Patented May 19, 1942

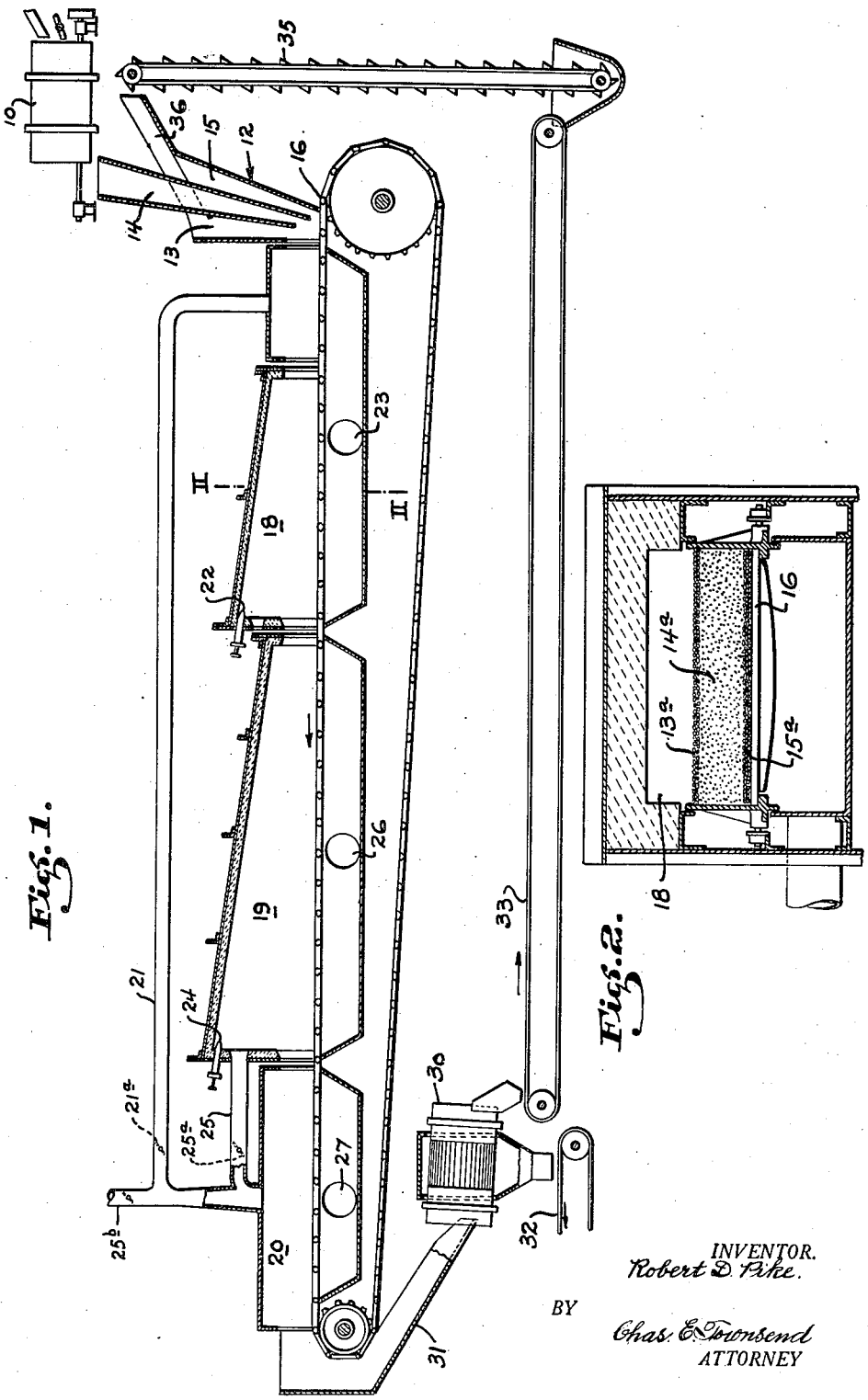

2,283,758

UNITED STATES PATENT OFFICE 2,283,758

PROCESS FOR CALCINING PRECIPITATED CALCIUM CARBONATE AND RECOVERING CO2 GAS THEREFROM

Robert D. Pike, Piedmont, Calif.

Application January 9, 1939, Serial No. 249,946

13 Claims. (Cl. 23—186)

The present invention relates to a process for calcining precipitated calcium carbonate to effect the production of a lime of high chemical reactivity and simultaneously the recovery of gas containing a relatively high content of $CO_2$.

The invention is particularly adapted to use in the beet sugar industry where, under present practice, a high-grade lump limestone is calcined in shaft kilns with coke. This practice has been found the only practical one for the production of a gas containing 34 per cent or more $CO_2$ by volume, dry basis, required for carbonation of the beet juice. The lime produced by the shaft kiln in the beet sugar process may be mixed with molasses in the so-called Steffens process, known to the sugar industry, to form insoluble saccharate of lime. The latter, after removal from the waste liquors by filtration, is added to the raw juice from the beets. The $CO_2$ containing gas from the shaft kiln is then blown through this mixture of saccharate of lime and raw beet juice, precipitating the lime as carbonate of lime in a very fine state of subdivision. During precipitation this carbonate of lime carries with it many of the impurities of the raw beet juice.

In another method which is practiced at the present time, the lime from the shaft kiln is hydrated, the hydrate being added to the raw beet juice before carbonation. In either case the result is the same to the extent that the lime produced by the kiln is recombined with its own $CO_2$ gas, again forming carbonate of lime. This carbonate of lime is chemically identical with the original limestone, with the exception that it contains about 2.5–7.5 per cent of organic matter and smaller amounts of inorganic material derived from the raw beet juice and some ash derived from the coke. The carbonate of lime is, however, unlike the original limestone in that it is in the form of a finely divided precipitate which when dry forms a flocculent powder. It has been proposed to calcine this precipitate for reuse in rotary kilns, but it has been found that the dust loss is excessive and that the concentration of $CO_2$ in the resulting gas is less than that required by the process of the sugar industry described above. Furthermore, the size of the equipment required for comparatively small production is prohibitive for practical purposes.

Vast quantities of this potentially valuable material are wasted in the present-day practice of the beet sugar industry, the material being stored as a waste product in ponds, from which it derives the name "pond lime." The accumulation of this material as waste constitutes an important economic loss to the industry. It is the object, therefore, of the present invention to provide a process for calcining pond lime which will result in the production of a lime of exceptionally high chemical reactivity and a process which will enable the recovering of a gas of sufficiently high $CO_2$ content for use in the carbonation step of the beet sugar process.

It is a further object of the invention to effect calcination of pond lime in large quantities with the use of relatively small calcining equipment and with a minimum production of dust. Further objects and advantages of the invention will be made apparent in the following specification, wherein reference is made to the accompanying drawing.

In the drawing:

Fig. 1 is a side elevation, diagrammatically illustrated, of a sintering machine in which the process of the present invention may be practiced, and Fig. 2 is a sectional view taken along line II—II of Fig. 1.

In practicing the present invention the pond lime ordinarily will have been stored for a period of a year or more in ponds where it is subjected to the drying effect of the air. This drying may be assisted to advantage by harrowing the surface of the pond. The material removed from the ponds for calcining is therefore apparently dry and in a dust-like condition, though it usually contains from 10 to 20 per cent moisture.

This pond lime is first converted into nodules by any suitable form of nodulizer or pelletizer known to the art, one form of which is indicated at 10 in the drawing. At this point water is added to produce nodules of approximately 3 to 4 mesh screen size. This size is not critical and may be varied if desired. Ordinarily the nodules so formed will contain about 30 to 35 per cent of moisture. In the event that the precipitated lime to be calcined should be taken directly from the filters in the beet sugar refinery, the process would be slightly different as it would then be necessary first to dry the precipitate, which contains from 45 to 55 per cent moisture, by a drying step not here disclosed, but in either case it is desirable that a nodule or pellet of substantially uniform screen size be produced.

The calcining step is carried out in a sintering machine, preferably in the type of machine disclosed in the patent to R. W. Hyde, 1,810,313, issued June 16, 1931, this machine being known commercially as a Dwight & Lloyd down-draft sintering machine. The machine as illustrated diagrammatically in the accompanying drawings comprises a three-compartment feed box 12 having a forward compartment 13, a central compartment 14, and a rear compartment 15. The forward and rear compartments 13 and 15 are, in the present invention, supplied with pebbles which form protective layers above and below the layer of nodules which is to be subjected to calcining heat. These pebbles, one layer of which is deposited directly upon the moving grate 16 of the sintering machine and the other layer of which is deposited on top of an interposed layer of nodules which are fed through the compartment 14 of the feed box, are of a material which is substantially inert both chemically and thermally. Silica, zircon and chromite are typical of materials which may be used for this purpose. These pebbles of inert material are graded to a size somewhat larger than the nodules, so that after the calcining process they may be conveniently separated by screening and returned for reuse, it being intended that the inert pebbles be recirculated while a continuous stream of nodules to be calcined is passing through the sintering machine. The pebbles may be of sizes varying from No. 4 mesh to ⅜ inch, although this grading may vary considerably, but is usually somewhat coarser than the grading of the nodules, and they are fed through the compartments 13 and 15 of the feed box at a rate that will effect the deposit on the moving grate 16, first of a layer of pebbles from ½ to 1 inch thick, then a layer of nodules from the compartment 14 of about 5 to 10 inches thick, and on top of the nodules another layer of pebbles about ½ to 1 inch thick, to produce the effect illustrated in cross section in Fig. 2, where the layers of inert pebbles and nodules from the compartments 13, 14 and 15 are indicated at 13a, 14a and 15a, respectively. The lowermost layer of pebbles, 15a, serves to protect the grate 16 from becoming overheated and the uppermost layer, 13a, protects the nodules from being overheated and therefore prevents their being overburned when they are subjected to the direct heat of the open flame in the calcining furnace 19.

The grate 16 is advanced slowly by a driving mechanism known to the art to cause the superposed layers of inert pebbles and nodules to be moved in a direction to the left as viewed in Fig. 1 of the drawings and to subject them successively to the steps of drying, preheating, calcining and cooling. The drying, preheating, and calcining steps are preferably effected by the passage of heated gas or air downwardly through the bed of nodules, while the final cooling step is preferably effected by cold air passed upwardly through the bed of nodules. In the drawings the drying zone is generally indicated at 17, the preheating zone at 18, the calcining zone at 19, and the cooling zone at 20. The initial drying is preferably effected by warm air which is a product of the cooling step although this may be effected by air heated by other means, as, for example, by heat interchange with the exit gas from calcining furnace 19, drawn out through flue 26. This air is delivered through a duct 21 which communicates between the cooling zone 20 or other source and the drying zone 17, and the air is drawn downwardly through the bed of moist nodules in the zone 17 to effect initial drying; thus the heat absorbed by the air in the cooling step is conserved and the initial drying is relatively slow or gradual, which eliminates the possibility of shattering the nodules because of too-rapid heating.

The drying is completed and the nodules are preheated to a temperature just below calcining heat, or about 1,500° F., in the zone 18, which is a furnace zone, and into which fire is directed by a burner nozzle 22, preferably in a direction opposite to the movement of the grate. The residual gases from the zones 17 and 18, which gases have been drawn downwardly through the bed of material on the grate, are withdrawn through a flue 23 by a fan or blower, not shown, and are directed thereby to a discharge stack.

After being thoroughly dried and preheated, the bed of material on the grate passes into the calcining zone 19, which is also a furnace zone, and is there subjected to the heating of a burner indicated at 24 or to a plurality of burners, if desired, which may be arranged effectively to distribute the heat within the zone 19. The burner 24 also produces a flame, preferably in a direction opposite to the direction of travel of the material on the grate 16, though the burner may be placed in any desired position. It is desirable that secondary air for the burner 24 be preheated and this may be accomplished by the provision of a flue 25 communicating between the cooling zone 20 and the calcining zone 19 as shown.

While the furnace zone 18 and calcining zone 19 are illustrated as covered by separate furnace structures, these structures may be combined into a single unit if desired, and the withdrawal of air through the flues 23 and 26 below the zones 18 and 19 will serve to maintain the prevalence of required temperatures in the zone areas.

The exhaust gases from the zone 19, which gases have passed downwardly through the material on the grate 16, are collected and withdrawn through a flue 26 by means of a fan or blower, not shown, and the gas so withdrawn, if the infiltration of outside air is maintained at a minimum, may contain as much as 34 per cent or more of $CO_2$ by volume, dry basis, making it suitable for use in the carbonation step of the beet sugar process described above. Suitable sealing means, which are known to the art, may be used in connection with the withdrawal of the exhaust gas from the zone 19 to prevent infiltration of air and consequent reduction of the $CO_2$ content.

I may purify the gas emerging from below the zone 19 so as to increase its content of $CO_2$. This may be done in accordance with conventional practice by treating all or a portion of the gas with a solution of sodium or potassium carbonate or other suitable known solvent or stripping fluid, thus forming bi-carbonate or other readily decomposible compound, and boiling this solution to liberate pure $CO_2$. If only a portion of the gas from zone 19 be thus treated the pure $CO_2$ may be mixed with the balance of the gas, giving a gas of predetermined content of $CO_2$ for delivery at the carbonators. Gas from zone 18 may also be employed.

The bed of material on the grate 16, which has now become incandescent from the calcining heat in the zone 19, next passes to the cooling zone 20, in which zone cold air is blown through a flue 27 and directed upwardly through the grate and the material thereon. The cold air thus introduced absorbs heat from the calcined bed until it reaches a temperature of approximately 800° F., at which temperature it passes through the flues 21 and 25 to be used as drying air and as secondary burner air, respectively, as described above. During this cooling step the top dressing or layer of inert pebbles 13a serves to prevent the updraft in the cooling zone 20 from carrying away any part of the very light and fragile calcined nodules.

The flues 21 and 25 are preferably provided with dampers 21a and 25a and a dampered vent 25b is provided to exhaust the gases from the cooler 20. Thus it is possible to regulate the passage of heated gases through the flues 21 and 25 so that any desired proportion of the gases may be directed through either of these flues and any proportion or all may be exhausted through the vent 25b, which in practice will communicate with an exhaust stack.

As the bed of material on the grate 16 is continuously undergoing the steps of the process described above, it is being delivered at the discharge end of the grate to a screen which serves the purpose of separating the fragile calcined nodules from the indestructible pebbles which have served as protective layers during the process. In the drawing a rotary screen 30 is illustrated for this purpose and the material from the grate may be delivered to this screen by means of a chute such as indicated at 31. The screen 30 effects separation of the smaller and more fragile nodules from the pebbles and the nodules are deposited upon a conveyor indicated at 32, while the pebbles are returned to the compartments 13 and 15 of the feed box to be recirculated. A mechanism for effecting the return of the pebbles is diagrammatically illustrated as a conveyor 33 which discharges into a bin 34, from which an endless bucket chain 35 elevates the pebbles and deposits them upon a chute 36, from which they flow to the feed box.

Among the advantages of the present invention is that of eliminating overburning of the nodules. This is partly effected by rapid calcination and small-sized nodules. The nodules are preferably not greater than 4 mesh and the calcining takes place very quickly, due to the use of a calcining flame of high thermal intensity in the calcining zone 19. Such a flame may be produced by using preheated secondary air as described and by using a relatively small amount of surplus air over that theoretically required for combustion. The top dressing of inert pebbles on the bed of nodules to be calcined makes possible the use of a flame of high thermal intensity without overburning the top layer of nodules. It has been found that 10 minutes is usually sufficient time for the nodules to be subjected to the calcining heat in zone 19.

As an example of the results that may be obtained in practicing the invention as described above, it is found that with a grate movement of 4 feet per minute the calcining zone need be no longer than 50 feet, thus creating an exposure to calcining heat of 12.5 minutes. Correspondingly, the length of the combined drying and preheating zones 17 and 18 may be about 30 feet and the cooling zone 20 need be no longer than 20 feet, giving a total length of 100 feet. If with these dimensions the width of the grate 16 is 60 inches and the depth of the bed of dried nodules is 6 inches, the supply of dried nodules is at a rate of 10 cubic feet per minute, or about 410 pounds per minute. Thus the machine would receive 12.0 tons per hour, or approximately 288 tons in a 24-hour day. This feed produces about 144 tons of calcines, representing a far greater production than could be expected from a rotary type kiln 8 feet in diameter and 315 feet long.

A further advantage of the calcining process described above is that it produces a lime having an extraordinarily high specific surface which is a measure of the surface of the particles per unit weight, as may be determined by the Klein turbitimeter test. Tests show that while pond lime calcined in rotary kilns and afterwards ground has a specific surface of about 2,100, the specific surface of lime prepared by the method herein described is about 3,290–3,450. This advantage results from forming the pond lime into small nodules and calcining them in a quiescent bed, as described, thus preventing the small-sized particles from coalescing to form larger particles, and also preventing the finer particles or dust-like constituent from being blown away, as occurs in a rotary kiln and in other methods of burning which involve agitation of the material. The higher specific surface thus derived is of great importance in the formation of saccharate of lime in the beet sugar process, because the speed of chemical reaction which is promoted by the greater specific surface is an advantage.

A novel and useful feature of my invention is the use of the pebbles or fragments of the grate dressing as heat exchange surfaces for the absorption of heat from the exit gases which pass downwardly through the bed of the grate dressing immediately after they emerge from the under face of the bed of nodules. By suitably adjusting the thickness of the grate dressing any desired part of the heat of the gas within practical limits may be absorbed. When the grate dressing in turn passes through the cooling zone it is subjected to an updraft of cold air. This cold air completely removes from the grate dressing any heat which it may have absorbed, and in passing upwardly through the nodules and top dressing becomes further heated. This hot air can, of course, as shown above, be utilized in any useful manner as, for example, in drying the nodules, or as preheated air for combustion in the calcining zone. This provides an extraordinarily efficient, simple and inexpensive means for recovering the sensible heat of the exit gas from the calcining zone.

The foregoing description, while more or less specific to certain features of the invention, is to be taken as illustrative and not as limiting the scope of the invention, which is defined by the appended claims.

Having thus described my invention, what I claim and desire to secure by Letters Patent is:

1. In a process for calcining precipitated calcium carbonate with production of highly reactive lime, the steps of placing on a moving grate a layer of nodules of the said calcium carbonate and placing upon the said layer of granular material which is substantially inert chemically and thermally throughout the process, and drying, heating and calcining the said nodules by down-draft heating without overburning the nodules on top of the layer.

2. The process of calcining precipitated calcium carbonate with production of a reactive lime which consists in forming the material into nodules and placing a layer of the said nodules on a moving grate which has been dressed for protection against heat with a layer of granular inert material; protecting the top of the layer of nodules with a dressing of material chemically and thermally inert throughout the process; successively drying, preheating and calcining the nodules by down-draft heating utilizing externally fired fuel, cooling by up-draft of air, separating the calcined nodules from the said granular inert material and separately collecting the exit gases from the calcining zone for utilization of their relatively high content of $CO_2$.

3. The process of calcining precipitated calcium carbonate with production of highly reactive lime which comprises the step of protecting the calcium carbonate with a layer of inert granular material unaffected by calcining heat and then calcining it with a vertical draft of hot gases.

4. The process of calcining precipitated calcium carbonate which comprises forming it into relatively small nodules, projecting a vertical draft of gases at a calcining temperature through a bed of said nodules under a protective layer of inert material unaffected by calcining heat of coarser mesh than the nodules, then screening to separate the calcined nodules from the inert material.

5. The process of calcining precipitated calcium carbonate with production of a reactive lime which consists in forming the material into nodules and placing a layer of the said nodules on a moving grate which has been dressed for protection against heat with a layer of granular inert material; protecting the top of the layer of nodules with a dressing of material chemically and thermally inert throughout the process; successively drying, preheating and calcining the nodules by down-draft heating utilizing externally fired fuel, cooling by up-draft of air, separating the calcined nodules from the said granular inert material.

6. The process of calcining precipitated calcium carbonate with production of a reactive lime which consists in forming the material into nodules and placing a layer of the said nodules on a moving grate which has been dressed for protection against heat with a layer of granular inert material; protecting the top of the layer of nodules with a dressing of material chemically and thermally inert throughout the process; successively drying, preheating and calcining the nodules by down-draft heating utilizing externally fired fuel, and separating the calcined nodules from the said granular inert material.

7. The process of calcining precipitated calcium carbonate with production of a reactive lime which consists in forming the material into nodules and placing a layer of the said nodules on a moving grate which has been dressed for protection against heat with a layer of granular inert material; protecting the top of the layer of nodules with a dressing of material chemically and thermally inert throughout the process; calcining the nodules by down-draft heat; and separating the calcined nodules from the said granular inert material.

8. In a process for calcining precipitated calcium carbonate with production of highly reactive lime, the steps of placing on a moving grate a layer of nodules of the said calcium carbonate and placing upon the said layer a layer of granular material which is substantially inert chemically and thermally throughout the process, drying, heating and calcining the said nodules by down-draft heating without overburning the nodules on top of the layer, and separating the calcined nodules from the said granular inert material.

9. The process of calcining calcium carbonate to produce highly reactive lime comprising protecting the calcium carbonate with a contiguous layer of discrete inert extraneous material unaffected by calcining heat such that the calcium carbonate is protected from over-burning during calcining, and then calcining the so-protected material by the passage of hot gases therethrough.

10. The process of calcining calcium carbonate to produce highly reactive lime comprising forming the calcium carbonate into relatively small nodules, protecting the nodules with a contiguous layer of discrete inert extraneous material unaffected by calcining heat, such that the nodules are prevented from being over-burned during calcining, and then calcining the so-protected material by the passage of gases therethrough.

11. The process of calcining calcium carbonate in relatively small nodules on a moving grate which comprises protecting said nodules from overburning during calcination by a contiguous layer of discrete inert extraneous material unaffected by calcining heat, and calcining the so-protected nodules by the passage of gases therethrough so that the gases first contact the said extraneous material.

12. The process of calcining calcium carbonate in relatively small nodules on a moving grate which comprises protecting said nodules from overburning during calcination by a contiguous layer of discrete inert extraneous material unaffected by calcining heat, said material being selected from the group consisting of silica, zircon, and chromite, and calcining the so-protected nodules by the passage of gases therethrough so that the gases first contact the said extraneous material.

13. Process of calcining calcium carbonate in relatively small nodules on a moving grate which comprises depositing said nodules on a continuous layer of discrete inert extraneous material unaffected by calcining heat, depositing over the nodules to protect the same during calcination from overburning a contiguous upper layer of discrete inert extraneous material unaffected by calcining heat, and calcining the so-protected nodules by the passage of gases therethrough, so that the gases first contact the upper layer of extraneous material.

ROBERT D. PIKE.